US 9,242,692 B2

(12) United States Patent
Nago (10) Patent No.: US 9,242,692 B2
(45) Date of Patent: Jan. 26, 2016

(54) COMPRESSION RING AND HEAD PARTS

(71) Applicant: SHIMANO INC., Sakai-ku, Sakai, Osaka (JP)

(72) Inventor: Daisuke Nago, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 0 days.

(21) Appl. No.: 14/216,681

(22) Filed: Mar. 17, 2014

(65) Prior Publication Data
US 2015/0259023 A1    Sep. 17, 2015

(51) Int. Cl.
| B62K 21/12 | (2006.01) |
| B62K 19/40 | (2006.01) |
| B62M 25/08 | (2006.01) |
| B62M 25/02 | (2006.01) |
| B62K 21/06 | (2006.01) |

(52) U.S. Cl.
CPC .................. *B62K 21/12* (2013.01); *B62K 19/40* (2013.01); *B62K 21/06* (2013.01); *B62M 25/02* (2013.01); *B62M 25/08* (2013.01); *Y10T 16/05* (2015.01)

(58) Field of Classification Search
CPC ........... B62J 6/18; B62K 21/06; B62K 21/12; B62M 25/02
USPC .................................................. 280/279, 280
See application file for complete search history.

(56) References Cited

U.S. PATENT DOCUMENTS

| 5,095,770 | A | | 3/1992 | Rader, III |
| 5,251,995 | A | * | 10/1993 | Chi ................................ 403/320 |
| 5,319,993 | A | * | 6/1994 | Chiang ......................... 74/551.1 |
| 5,387,255 | A | * | 2/1995 | Chiang ......................... 74/551.1 |
| 5,605,076 | A | * | 2/1997 | Wu .............................. 74/551.1 |
| 5,681,119 | A | * | 10/1997 | Marui ............................ 384/545 |
| 5,775,709 | A | * | 7/1998 | Chen ............................. 280/279 |
| 6,167,780 | B1 | * | 1/2001 | Chen ............................ 74/551.1 |
| 6,220,398 | B1 | * | 4/2001 | Wu ............................ 188/24.11 |
| 6,343,806 | B1 | * | 2/2002 | Lee ............................... 280/272 |
| 6,416,071 | B2 | * | 7/2002 | Marui ............................ 280/279 |
| 6,892,604 | B2 | * | 5/2005 | Tison et al. .................. 74/551.1 |
| 6,983,949 | B2 | | 1/2006 | Ueno et al. |
| 7,192,044 | B2 | * | 3/2007 | Ueno ............................ 280/280 |
| 7,566,065 | B2 | * | 7/2009 | Fukui .......................... 280/281.1 |
| 2005/0057017 | A1 | * | 3/2005 | Hara et al. ................... 280/279 |
| 2006/0145446 | A1 | * | 7/2006 | Schmider .................. 280/281.1 |
| 2013/0026729 | A1 | * | 1/2013 | King et al. .................... 280/270 |
| 2013/0154234 | A1 | * | 6/2013 | Shadwell ...................... 280/279 |

* cited by examiner

*Primary Examiner* — Joseph Rocca
*Assistant Examiner* — Michael Stabley
(74) *Attorney, Agent, or Firm* — Jeffer Mangels Butler & Mitchell LLP; Brennan C. Swain, Esq.

(57) ABSTRACT

A compression ring that is configured to be disposed between a bearing and a stem of a bicycle head parts assembly. The compression ring includes a central opening for receiving a steering column, a cut out portion, a first cable passing part disposed radially outwardly from the central opening, and a first positioning part for positioning the compression ring with respect to the stem so that the first cable passing part is aligned with a second cable passing part defined in the stem.

19 Claims, 10 Drawing Sheets

COMPRESSION RING AND HEAD PARTS

FIELD OF THE INVENTION

The present invention relates to a compression ring, and more particularly to a compression ring that includes at least one cable passing part defined therein.

BACKGROUND OF THE INVENTION

Brake cables and shift cables often run through the tubular part of bicycles. See, for example, U.S. Pat. No. 6,983,949 and U.S. Pat. No. 5,095,770, both of which are incorporated by reference herein in their entireties. In particular, the cables often run through the head parts assembly, which may include a compression ring associated with the bearing. A need exists for a novel compression ring that allows cables to pass therethrough and into the stem.

SUMMARY OF THE PREFERRED EMBODIMENTS

In accordance with a first aspect of the present invention there is provided a bicycle stem that includes a tubular main body portion with an internal cavity, and a first outer casing holder that is configured to hold an end of a first outer casing. The first outer casing holder is disposed in the internal cavity.

In accordance with a second aspect of the present invention, the bicycle stem according to the first aspect is configured so that the first outer casing holder extends in a longitudinal direction of the main body portion. In accordance with a third aspect of the present invention, the bicycle stem according to the first aspect further includes a second outer casing holder that is configured to hold an end of a second outer casing. In accordance with a fourth aspect of the present invention, the bicycle stem according to the third aspect is configured so that the first and second outer casing holders are disposed in the internal cavity and are configured to guide an inner cable therebetween. In accordance with a fifth aspect of the present invention, the bicycle stem according to the third aspect is configured so the first and second outer casing holders hold the ends of the first and second outer casings and an inner cable extends between the first and second outer casing holders and forms a bend therebetween. In accordance with a sixth aspect of the present invention, the bicycle stem according to the third aspect is configured so that the first outer casing holder is disposed at a first location within the internal cavity of the main body portion, the second outer casing holder is disposed at a second location within the internal cavity of the main body portion, and the first location is spaced from the second location within the internal cavity.

In accordance with a seventh aspect of the present invention, the bicycle stem according to the sixth aspect further includes a steering column fixing member, and a connecting portion connecting the steering column fixing member and an end portion of the main body portion. The second outer casing holder is disposed at or defined in the connecting portion. In accordance with an eighth aspect of the present invention, the bicycle stem according to the seventh aspect is configured so that the steering column fixing member has a fixing opening that defines a center axis, and the second outer casing holder extends substantially in a direction of the center axis of the fixing opening.

In accordance with a ninth aspect of the present invention, the bicycle stem according to the third aspect further includes an inner cable guiding member disposed in the internal cavity. The inner cable guiding member defines an inner cable path between the first and the second outer casing holders. In accordance with a tenth aspect of the present invention, the bicycle stem according to the ninth aspect is configured so that the inner cable guiding member comprises a resin material and is separate from the main body portion. In accordance with an eleventh aspect of the present invention, the bicycle stem according to the tenth aspect is configured so that the main body portion includes a recess defined in a periphery thereof. The inner cable guiding member is disposed in the recess. In accordance with a twelfth aspect of the present invention, the bicycle stem according to the ninth aspect is configured so that the inner cable guiding member includes a groove defined therein that extends between the first and second outer casing holders. The groove includes the inner cable path and is configured to guide an inner cable thereralong. In accordance with a thirteenth aspect of the present invention, the bicycle stem according to the twelfth aspect is configured so that the main body portion includes an opening defined therethrough. The opening is aligned with and communicates with the groove of the inner cable guiding member.

In accordance with a fourteenth aspect of the present invention, the bicycle stem according to the ninth aspect is configured so that at least one of the first and second outer casing holders is integral with the inner cable guiding member. In accordance with a fifteenth aspect of the present invention, the bicycle stem according to the ninth aspect is configured so that the inner cable path is a tunnel that extends through the inner cable guiding member between the first and second outer casing holders. In accordance with a sixteenth aspect of the present invention, the bicycle stem according to the ninth aspect is configured so that the inner cable guiding member includes at least one fastening member that fastens the inner cable guiding member to the main body portion. The fastening member extends in a longitudinal direction of the main body portion.

In accordance with a seventeenth aspect of the present invention, the bicycle stem according to the sixteenth aspect is configured so that the main body portion includes at least one abutting portion extending inwardly from an inner surface thereof, and a collar portion of the inner cable guiding member abuts the abutting portion. In accordance with an eighteenth aspect of the present invention, the bicycle stem according to the seventeenth aspect is configured so that the abutting member includes a fastening opening for receiving the fastening member.

In accordance with a nineteenth aspect of the present invention, there is provided a bicycle stem that includes a tubular main body portion that includes an internal cavity, a first outer casing holder configured to hold an end of a first outer casing, and a second outer casing holder configured to hold an end of a second outer casing. In accordance with a twentieth aspect of the present invention, the bicycle stem according to the nineteenth aspect is configured so that the first and second outer casing holders are configured to hold the ends of the first and second outer casings respectively such that an inner cable pass can pass through the internal cavity. In accordance with a twenty first aspect of the present invention, the bicycle stem according to the nineteenth aspect is configured so that when the first and second outer casing holders hold the ends of the first and second outer casings, an inner cable extends between the first and second outer casing holders and forms a bend therebetween.

In accordance with a twenty second aspect of the present invention, there is provided a compression ring that is configured to be disposed between a bearing and a stem of a bicycle head parts assembly. The compression ring includes a central opening for receiving a steering column, a cut out portion, a first cable passing part disposed radially outwardly from the central opening, and a first positioning part for positioning the compression ring with respect to the stem so that the first cable passing part is aligned with a second cable passing part defined in the stem.

In accordance with a twenty third aspect of the present invention, the compression ring according to the twenty second aspect is configured so that the first positioning part is disposed on an upper surface of the compression ring, the first positioning part being configured to engage a second positioning part disposed on a lower surface of the stem. Preferably, the first cable passing part is aligned with a third cable passing part disposed at the spacer ring when the first positioning part positions the compression ring with respect to the spacer ring. Preferably, the spacer ring has a fourth positioning part to position the spacer ring with respect to the stem such that the third cable passing part is aligned with the second cable passing part.

In accordance with a twenty fourth aspect of the present invention, the compression ring according to the twenty second aspect is configured so that the first positioning part is disposed on an upper surface of the compression ring, and is configured to engage a third positioning part disposed on a lower surface of a spacer ring that is disposed between the stem and the compression ring. In accordance with a twenty fifth aspect of the present invention, the compression ring according to the twenty third aspect is configured so that one of the first and second positioning parts comprises a female component and the other of the first and second positioning parts comprises a male component.

In accordance with a twenty sixth aspect of the present invention, the compression ring according to the twenty second aspect is configured so that the central opening defines a central axis and the first cable passing part defines an axis, and the axis of the first cable passing opening is substantially parallel to the central axis. In accordance with a twenty seventh aspect of the present invention, the compression ring according to the twenty second aspect further includes a disc portion and a protrusive portion extending from the disc portion, the protrusive portion being configured to support the steering column received in the central opening. In accordance with a twenty eighth aspect of the present invention, the compression ring according to the twenty seventh aspect is configured so that the protrusive portion includes an inner ring portion. An outer peripheral surface of the disc portion defines a first outer diameter and an outer peripheral surface of the inner ring portion defines a second outer diameter, and the second outer diameter is smaller than the first outer diameter.

In accordance with a twenty ninth aspect of the present invention, the compression ring according to the twenty eighth aspect is configured so that the disc portion includes an upper surface, a lower surface and a tapered surface that tapers downwardly from an external circumference of the upper surface toward an external circumference of the lower surface. The first cable passing part penetrates through an area of the disc portion between an internal circumference of the tapered surface and the outer peripheral surface of the inner ring portion. In accordance with a thirtieth aspect of the present invention, the compression ring according to the twenty eighth aspect further includes a rib portion extending radially outwardly from the outer peripheral surface of the inner ring portion. In accordance with a thirty first aspect of the present invention, the compression ring according to the thirtieth aspect is configured so that a plurality of the rib portions are disposed around the outer peripheral surface of the inner ring portion.

In accordance with a thirty second aspect of the present invention, there is provided a bicycle head parts assembly that includes a bearing configured to be disposed between a bicycle stem and a head tube of a bicycle frame and to rotatably support the bicycle stem on the head tube, and a compression ring disposed between the bearing and the bicycle stem. The compression ring includes a central opening for receiving a steering column, a cut out portion, a first cable passing part disposed radially outwardly from the central opening, and a first positioning part for positioning the compression ring with respect to the bicycle stem such that the first cable passing part is aligned with a second cable passing part defined in the bicycle stem.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring to FIGS. 1-15, a bicycle that includes a bicycle head parts assembly 100 and a stem 10 is illustrated in accordance with a preferred embodiment of the present invention.

Figure 2:
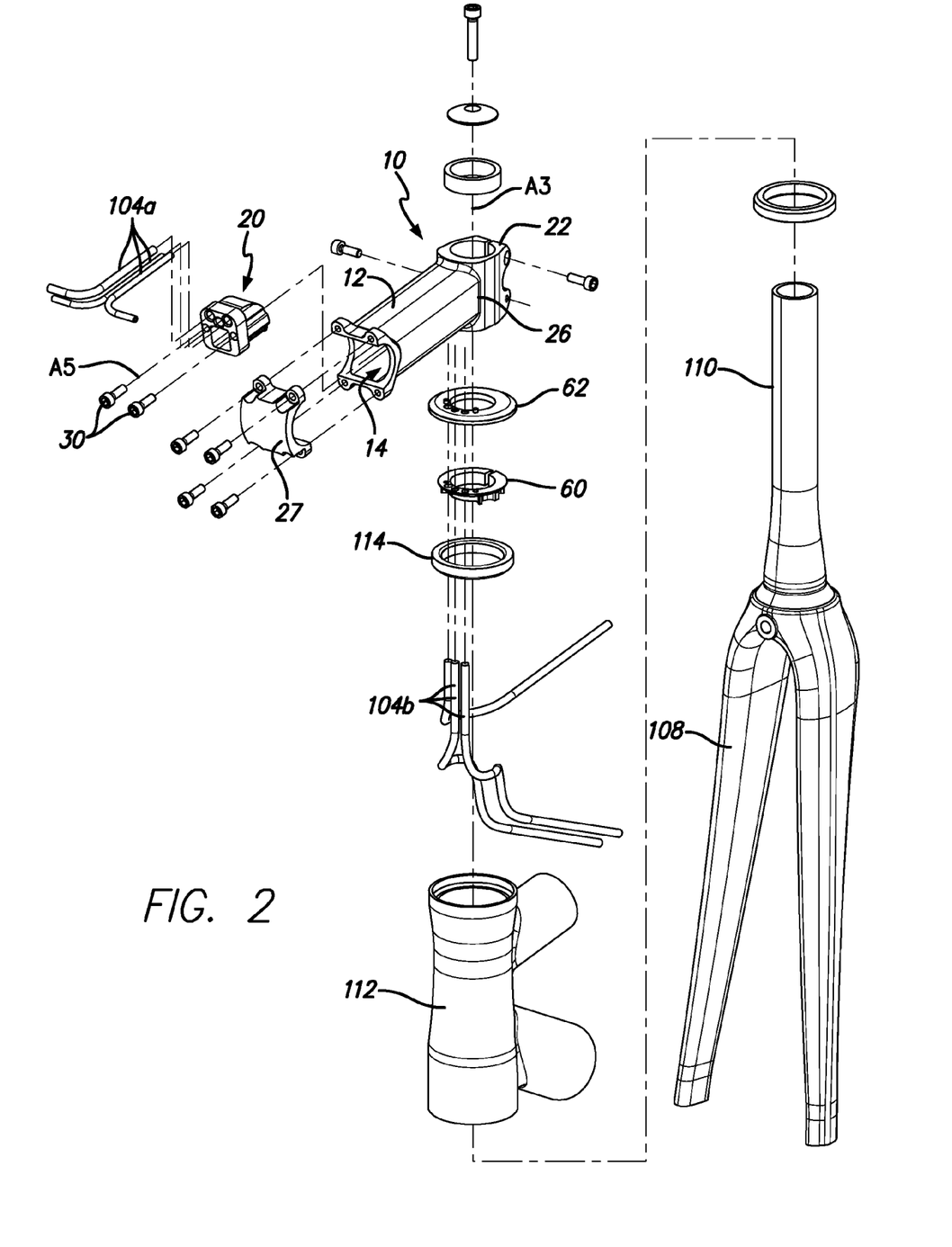
FIG. 2 is a an exploded view of the bicycle parts head assembly of FIG. 1.
Figure 8:
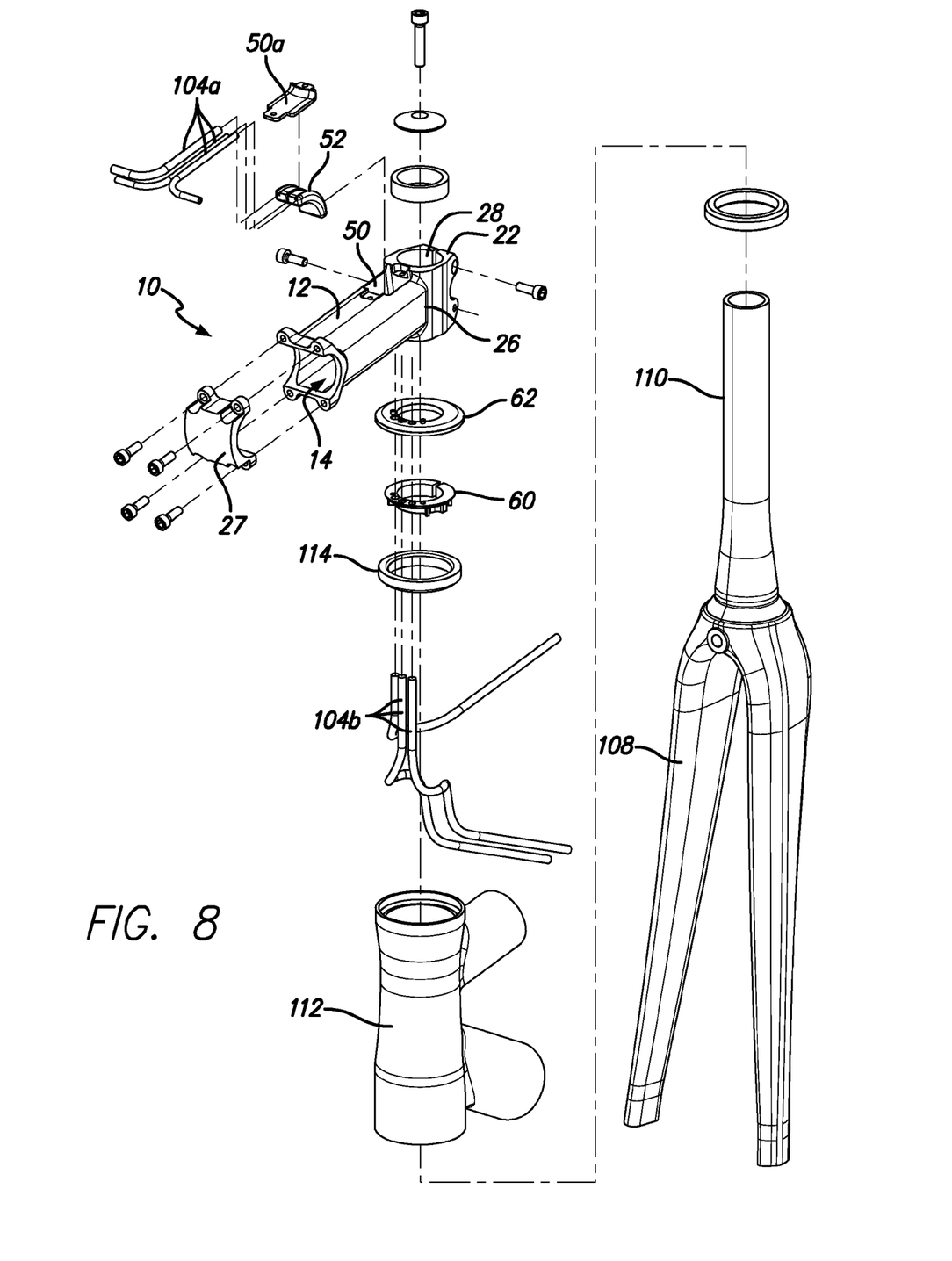
FIG. 8 is a an exploded view of the bicycle parts head assembly of FIG. 7.

Generally, the stem 10 includes a tubular main body portion 12 having an inner surface 40 and an internal cavity 14 through which at least one cable 102 (e.g., a cable that operates a brake, a derailleur, an adjustable seatpost, or suspension) extends. The cable 102 includes an outer casing 104 and an inner cable 106. As shown in FIGS. 2 and 8, the bicycle head parts assembly 100 includes a bearing 114, compression ring 60 and spacer 62, which are described more fully below. The bicycle in the present embodiment also includes a fork 108 and head tube 112 which are tubular parts of a bicycle frame, and the fork 108 includes a steering column 110.

In a preferred embodiment of the present invention, the stem 10 includes at least a first outer casing holder 16 disposed in the internal cavity 14. The outer casing 104 comprises a first outer casing 104a disposed in the internal cavity 14 closer to a handlebar, and a second outer casing 104b disposed in the internal cavity 14 closer to the steering column 110. The first outer casing holder 16 is configured to hold an end of the first outer casing 104a. Preferably, the stem 10 also includes a second outer casing holder 18 that is disposed inside of the stem 10 and that is configured to hold an end of the second outer casing 104b. It will be understood by those of ordinary skill in the art that, in use, the first outer casing holder 16 holds the end of a first outer casing portion of a cable, the second outer casing holder 18 holds the end of a second outer casing portion of a cable, and the inner cable 106 extends from the first outer casing holder 16 along a path P1 having a bend between the first and second outer casing holders 16 and 18, and into the second outer casing 104b (which is held by the second outer casing holder 18).

The inner cable 106 is exposed between the first and second outer casing holders 16 and 18 and is not encased in an outer casing (as in the prior art). Therefore, the friction between the inner cable 106 and outer casing 104 caused by an operation of the inner cable 106 in the prior art is reduced at the bending point of the inner cable 106. It will be appreciated that any type of outer casing holder that holds the outer casing and allows the inner cable to extend inside thereof is within the scope of the present invention. Generally, the present invention includes first and second outer casing holders 16 and 18 that hold ends of the first and second outer casings 104a and 104b and allow the inner cable 106 to extend therebetween in a bent configuration. For example, the outer casing holder can be a flange that protrudes from the inner surface of the main body portion of the stem that has an opening therein that holds the outer casing of the cable. The second outer casing holder can also be any component that holds the outer casing.

Figure 3:
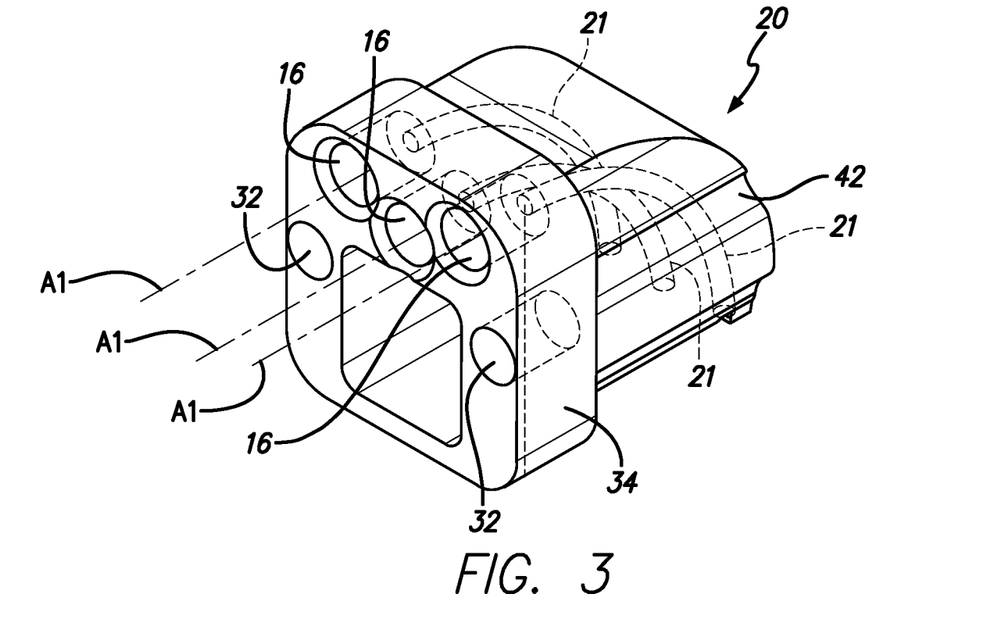
FIG. 3 is a perspective view of the inner cable guiding member of FIG. 1.
Figure 4:
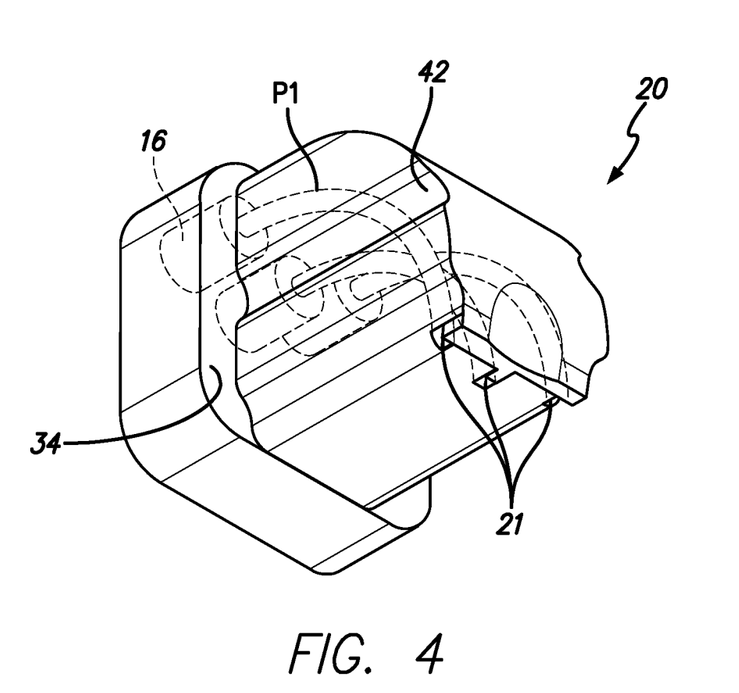
FIG. 4 is another perspective view of the inner cable guiding member of FIG. 1.

As shown in FIGS. 1-7, in a preferred embodiment, the stem 10 includes an inner cable guiding member 20 that includes at least the first outer casing holder 16 integral therewith and defines at least one and preferably a plurality of inner cable paths P1 between the first and the second outer casing holders 16 and 18. As shown in FIGS. 3-4, in a preferred embodiment, inner cable paths P1 are each a tunnel 21 that extends through the inner cable guiding member 20 between the first and second outer casing holders 16 and 18. Preferably, the inner cable guiding member 20 includes three first outer casing holders 16 and three inner cable paths P1 extending from the three first outer casing holders, respectively. In an exemplary embodiment, the first outer casing holders 16 are used to guide the inner cables 106 to operate front and rear derailleurs and a rear brake.

Figure 1:
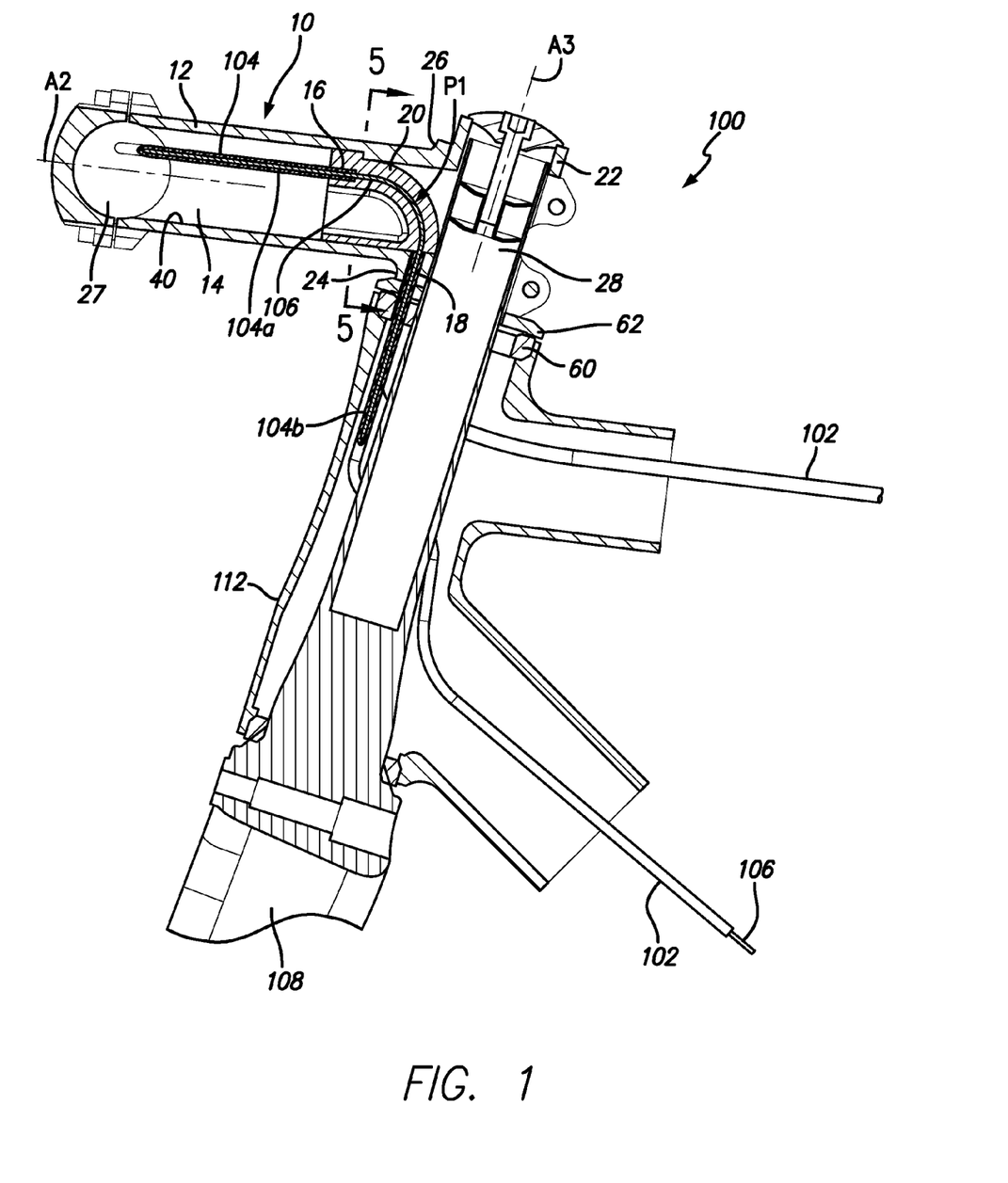
FIG. 1 is a cross-sectional side view of a bicycle parts head assembly with a stem and inner cable guiding member in accordance with a preferred embodiment of the present invention.

As is best shown in FIG. 1, the inner cable guiding member 20 is disposed in the internal cavity 14 of the tubular main body portion 12. In a preferred embodiment, the inner cable guiding member 20 is comprised of a resin material and is separate from the main body portion 12 so that the inner cable guiding member 20 can flex as necessary during use so as to relieve or reduce any force between the inner cable 106 and the inner cable guiding member 20. However, this is not a limitation on the invention, and the inner cable guiding member can be made of any other material, such as metal, and can also be integrated with the stem 10. Preferably, the first outer casing holders 16 extend in a longitudinal direction of the main body portion 12. In other words, an axis A1 defined by the first outer casing holders 16 is substantially parallel to an axis A2 defined by the longitudinal direction of the tubular main body portion 12.

Generally, the first outer casing holder 16 is disposed at a first location of the stem 10 within the internal cavity 14 of the main body portion 12 and the second outer casing holder 18 is disposed at a second location of the stem 10, and the first location is spaced from the second location. See FIG. 1 for an example of the first and second locations.

Figure 7:
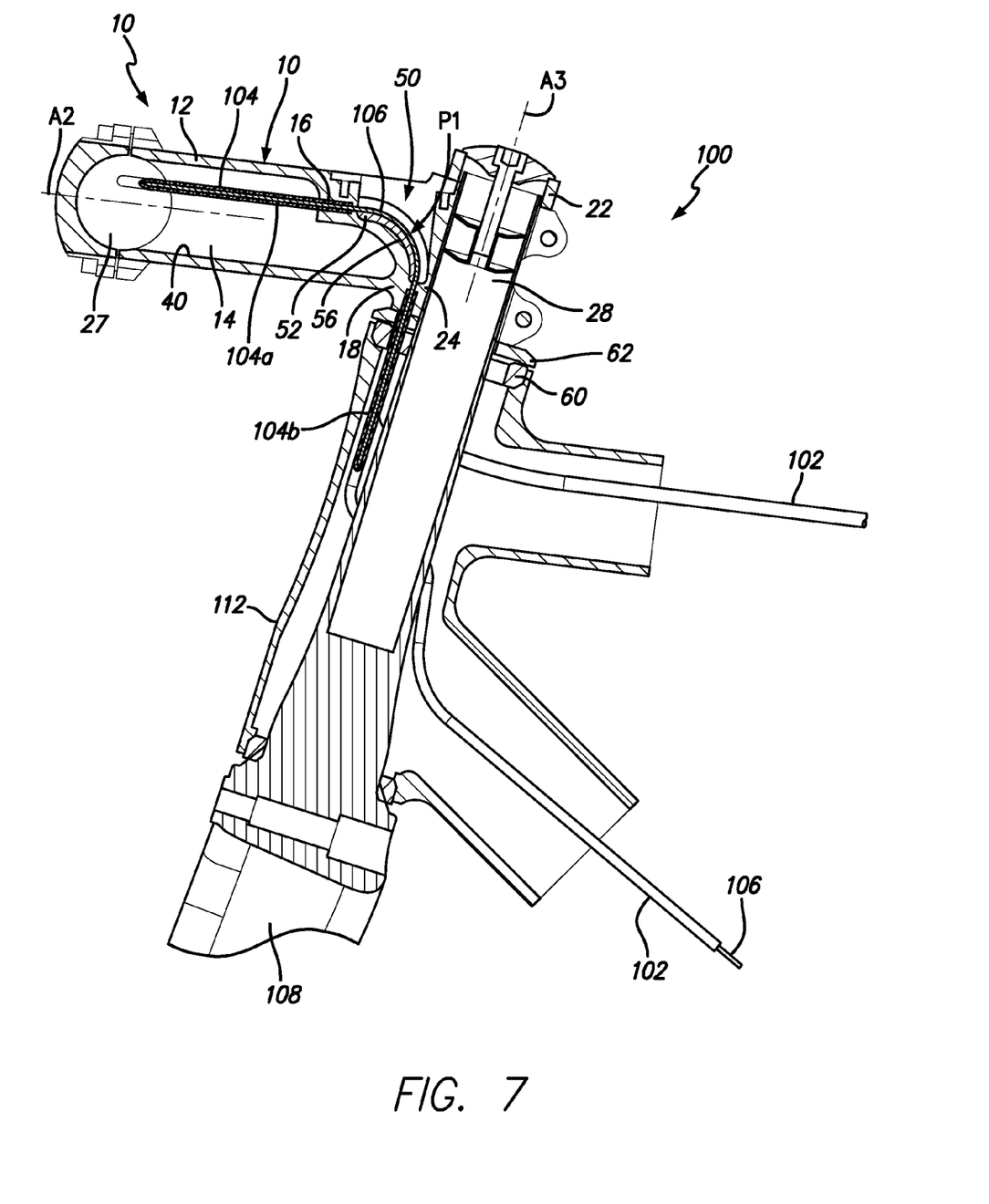
FIG. 7 is a cross-sectional side view of a bicycle parts head assembly with a stem and inner cable guiding member in accordance with another preferred embodiment of the present invention.

As shown in FIG. 2, in a preferred embodiment, the bicycle stem 10 includes a steering column fixing member 22 and a connecting portion 24 that connects the steering column fixing member 22 and an end portion 26 of the main body portion 12. Preferably, the stem 10 also includes a handlebar fixing member 27 at the end opposite the steering column fixing member 22. In a preferred embodiment, the first location corresponds to a upper portion of the inner surface 40 and the second location corresponds to an bottom portion of the inner surface closer to the steering column fixing member 22 in a state where the stem 10 is attached to the steering column 110. In a further preferred embodiment, as is best shown in FIGS. 1 and 7, the second outer casing holder(s) 18 are formed in the connecting portion 24. In this embodiment, the second outer casing holder 18 is integral with the connecting portion 24 of the stem 10. Preferably, the steering column fixing member 22 includes a fixing opening 28 that defines a center axis A3, and the second outer casing holders 18 extend substantially in a direction of the center axis A3 of the fixing opening 28. In other words, an axis A4 defined by the second outer casing holder 18 extends substantially parallel to the center axis A3 of the fixing opening 28 (see FIG. 12). Therefore, the end of the second outer casing 104b held in the second outer casing holder 18 extends substantially parallel to the longitudinal direction of the steering column 110. Therefore, the inner cable 104a extends between the first and second outer casing holders 16 and 18 with a relatively slight curve and can pass thereafter between the steering column 110 and head tube 112.

It will be appreciated by those of ordinary skill in the art, that the end of the second outer casing 104b is received in and secured within the second outer casing holder 18. In an exemplary embodiment, the ends of the second outer casings 104b can be press fit into or adhered within the second outer casing holders 18. In another embodiment, the second outer casing holders 18 can be integral with the inner cable guiding member 20. However, the location of the first and second outer casing holders 16 and 18 is not restricted to the inside of the internal cavity 14 and they can be located outside of the internal cavity 14 or outside of the stem 10.

Figure 5:
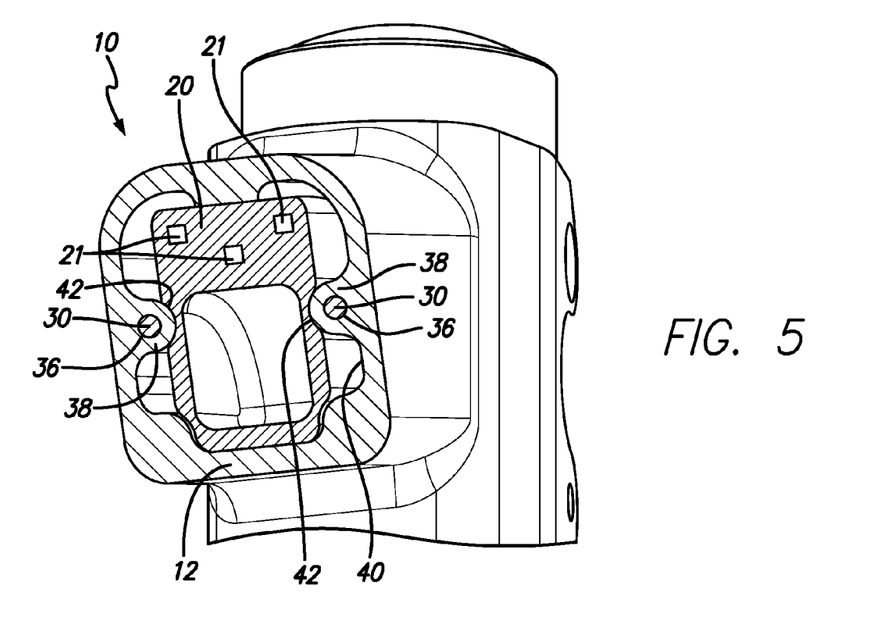
FIG. 5 is a cross-sectional view taken along line 5-5 of FIG. 1.
Figure 6:
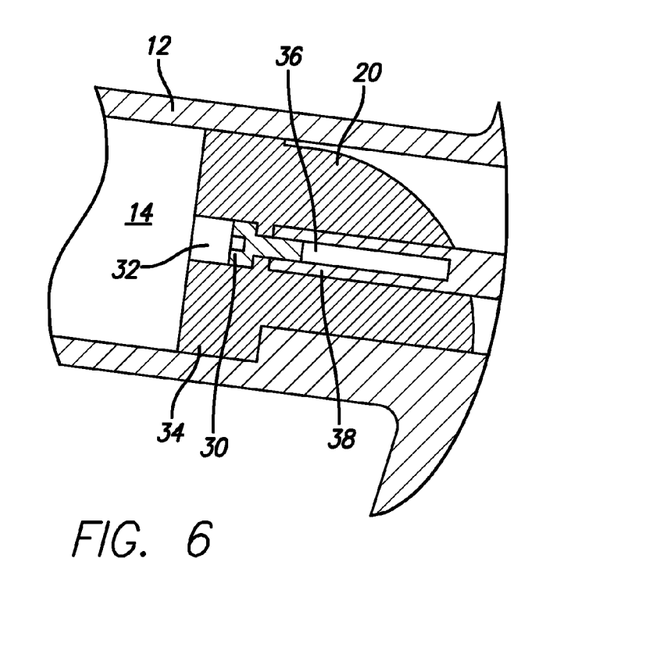
FIG. 6 is a cross-sectional side view of a portion of the stem and inner cable guiding member of FIG. 1.

With reference to FIGS. 3-6, in a preferred embodiment, the inner cable guiding member 20 includes at least one fastening member 30 that fastens the inner cable guiding member 20 to the main body portion 12. Preferably, the fastening member 30 is a threaded fastener, rivet or the like that extends through an opening 32 defined in a collar portion 34 of the inner cable guiding member 20 and into a fastening opening 36 defined in an abutting portion 38 that extends from an inner surface 40 of the main body portion 12. The collar portion 34 protrudes from a side of the inner cable guiding member 20 and the fastening opening 36 is aligned with opening 32. Preferably, abutting portion 38 abuts a rear surface of the collar portion 34, and is received in a groove 42 defined in the outer surface of the inner cable guiding member 20, as shown in FIG. 5. Therefore, the inner cable guiding member 20 is positioned within the internal cavity 14 in the longitudinal direction of the main body portion 12.

In a preferred embodiment, the fastening member 30 extends in the longitudinal direction of the main body portion 12. In other words, an axis A5 defined by the fastening member 30 extends substantially parallel to the axis A2 defined by the tubular main body portion 12 (see FIG. 6). Therefore, the inner cable guiding member 20 is fixedly secured to the stem 10 so as to resist a pushing force of the inner cable 106 in the longitudinal direction of the main body portion 12.

Figure 9:
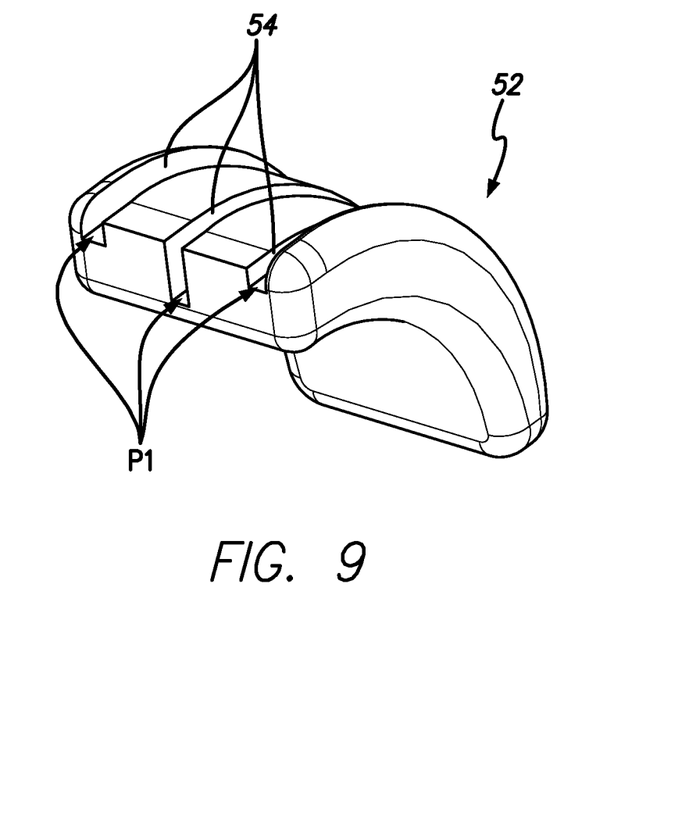
FIG. 9 is a perspective view of the inner cable guiding member of FIG. 7.
Figure 10:
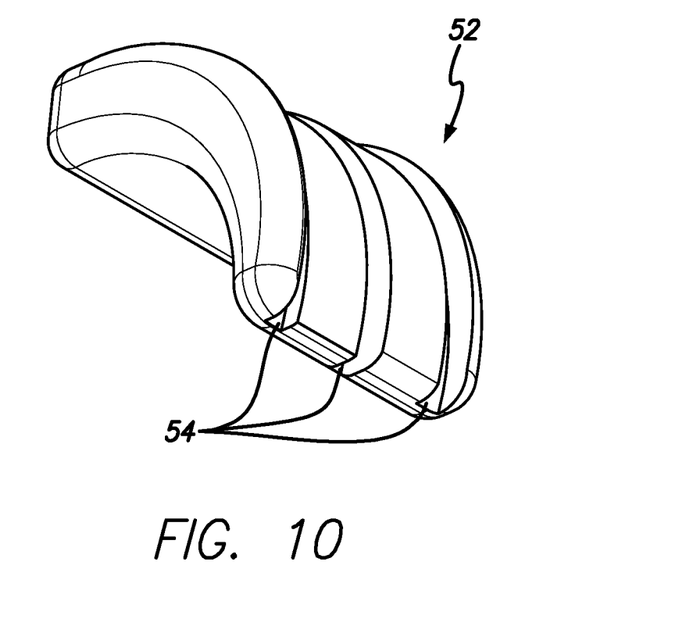
FIG. 10 is another perspective view of the inner cable guiding member of FIG. 7.
Figure 11:
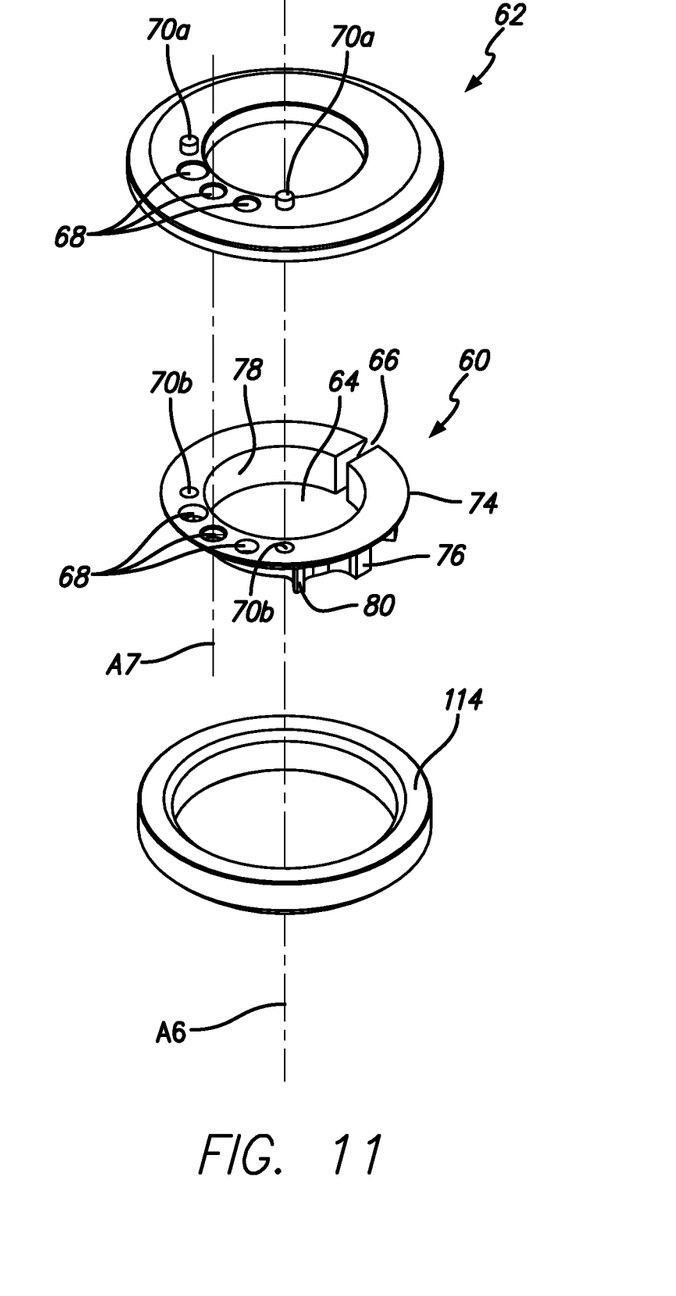
FIG. 11 is an exploded view of a compression ring, spacer ring and bearing in accordance with a preferred embodiment of the present invention.

FIGS. 7-10 show another embodiment of the present invention. In this embodiment, both of the first and second outer casing holders 16 and 18 are defined in and integral with the stem 10. As shown in FIGS. 7-8, the main body portion 12 includes a recess 50 defined in a periphery thereof, and an inner cable guiding member 52 is disposed or received in the recess 50. The recess 50 includes a seat member 56 on which the cable guiding member 52 is placed, the seat member 56 defines a bottom portion of the recess 50. As shown in FIGS. 9-10, the three inner cable paths P1 are grooves 54 defined in the inner cable guiding member 52 that extend between the first and second outer casing holders 16 and 18. Preferably, the recess 50 has a cover 50a that can be secured to the main body portion 12 via threaded fasteners or the like.

As shown in FIG. 7, the inner cable guiding member 52 rests on the seat member 56 that positions the inner cable guiding member 52 such that the ends of the grooves 54 are aligned with cable openings that communicate the first and second outer casing holders 16 and 18 with the grooves 54 and allow the inner cable 106 to pass therethrough. In this embodiment, the first and second outer casing holders 16 and 18 are integral with or a part of the stem main body portion 12 and the connecting portion 24. In another embodiment, they can be separate pieces that are secured within the internal cavity 14.

As shown in FIGS. 11-15, in a preferred embodiment, the bicycle head parts assembly 100 also includes a compression ring 60 that is disposed between the bearing 114 and the stem 10. When assembled, the compression ring 60 is compressed into an inner surface of the bearing 114 for secure connection of the bearing 114 to the head tube 112. When necessary, a spacer 62 can also be provided to adjust the height of the stem 10. The compression ring 60 preferably includes a central opening 64 for receiving the steering column 110, a cut out portion 66, at least one first cable passing part 68 disposed radially outwardly from the central opening 64, and a first positioning part for positioning the compression ring 60 with respect to the stem 10 so that the first cable passing part 68 is aligned with a second cable passing part 68 defined in the stem 10. It will be appreciated that the second cable passing part 68 is in communication with the second outer casing holder 18, when the second outer casing holder 18 is defined in the stem, as shown in FIGS. 1 and 7 above.

Figure 12:
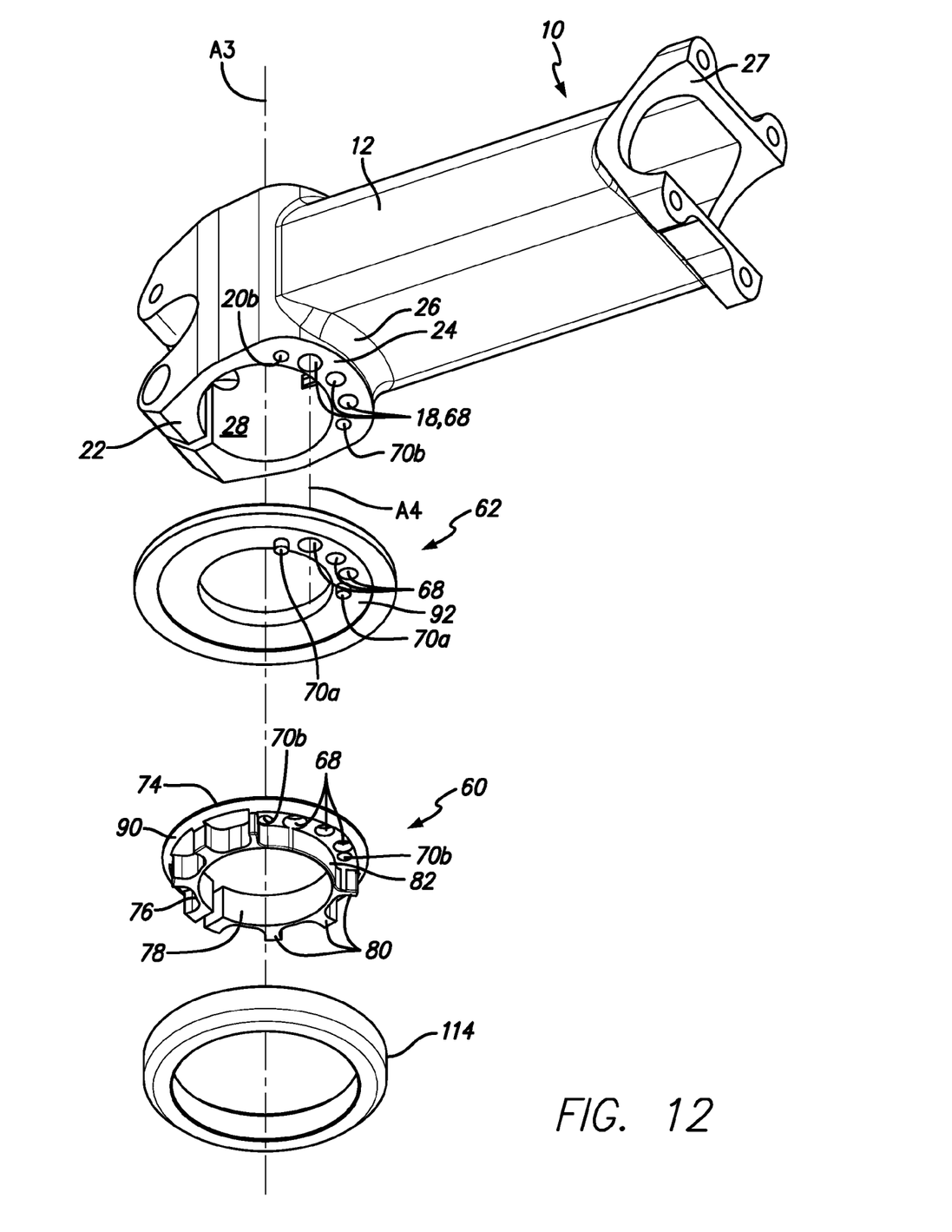
FIG. 12 is another exploded view of the compression ring, spacer ring and bearing of FIG. 11, together with the stem.
Figure 13:
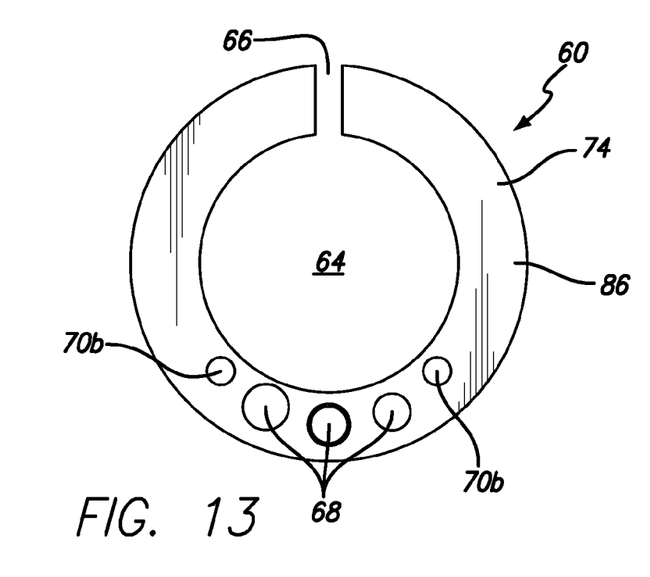
FIG. 13 is a top plan view of the compression ring.

As shown in FIG. 12, in a preferred embodiment, the compression ring 60 includes a disc portion 74 and a protrusive portion 76 extending downwardly therefrom. The protrusive portion 76 is configured to support the steering column 110 received in the central opening 64. It will be understood that the protrusive portion 76 is not limited to a ring shaped portion. For example, the protrusive portion can be a plate shaped portion or a pillar shaped portion. However, in a preferred embodiment, the protrusive portion 76 includes an inner ring portion 78 protruding from the disc portion 74 and configured to be substantially perpendicular to the disc portion 74. The compression ring 60 further includes at least one rib portion 80 for reinforcement of the compression ring 60, extending radially outwardly from an outer peripheral surface 82 of the inner ring portion 78. Preferably, the compression ring 60 includes a plurality of rib portions 80 extending outwardly from the outer peripheral surface 82 of the inner ring portion 78, as is best shown in FIGS. 12 and 15.

Figure 15:
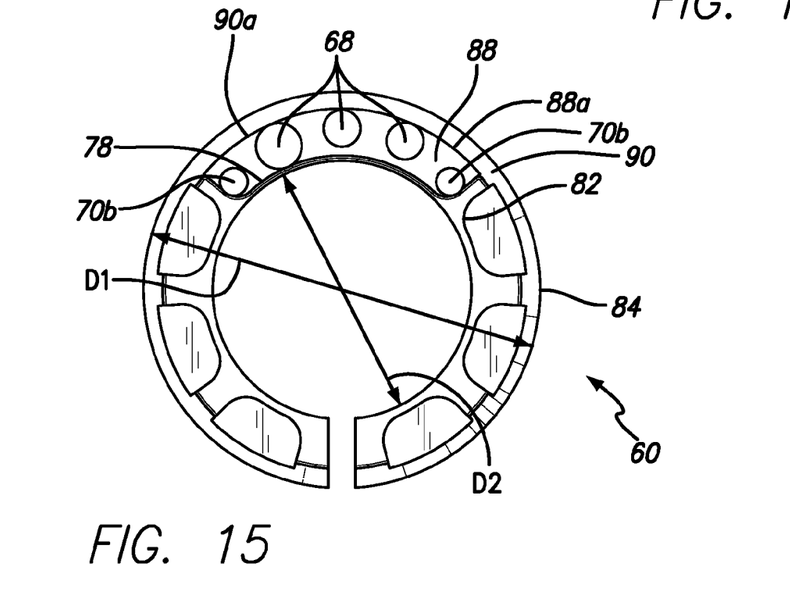
FIG. 15 is a bottom plan view of the compression ring.

As is shown in FIG. 15, in a preferred embodiment, an outer peripheral surface 84 of the disc portion 74 defines a first outer diameter D1 and the outer peripheral surface 82 of the inner ring portion 78 defines a second outer diameter D2, and the second outer diameter D2 is smaller than the first outer diameter D1. Therefore the compression ring 60 is configured to be a thin body for easy flex and compression.

It will be appreciated that the compression ring 60, spacer 62 and stem 10 all include positioning parts that prevent the compression ring 60, spacer 62 and stem 10 from rotating with respect to one another. Generally, the positioning parts are complementary male protrusions 70a and female openings 70b that together prevent rotation of the compression ring 60, spacer 62 and stem 10 with respect to one another. It will be appreciated that the protrusions 70a and openings 70b can be reversed from what is shown in the drawings. For this reason, the protrusions 70a and openings 70b are referred to generally herein as "positioning parts." For example, the drawings show protrusions 70a extending upwardly and downwardly from the spacer 62 and into corresponding openings 70b in the compression ring 60 and the stem 10. However, in another embodiment, the protrusions can extend downwardly from the stem 10 and upwardly from the compression ring 60 and into corresponding openings in the spacer 62. In another embodiment, the spacer can be omitted and the compression ring 60 can include protrusions that extend upwardly into the openings in the stem 10 or the stem 10 can include protrusions that extend downwardly into the openings in the compression ring 60.

It will also be understood that the cable passing parts 68 are openings in the compression ring 60, spacer 62 and stem 10 that allow the cables 102 to extend or pass therethrough. The cable passing parts can be enclosed openings, as shown in the drawings, or can be recesses or troughs that are open radially outwardly to the exterior surface of the compression ring 60, spacer 62 or connecting portion 24 of the stem 10, or can be recesses or troughs that are open radially inwardly to the central opening of the compression ring 60, the spacer 62 or the column fixing member 22 of the stem 10.

In a preferred embodiment, the first positioning part is at least one protrusion 70a that is disposed on the upper surface 86 of the disc portion 74 of the compression ring 60, and the second positioning part is at least one opening 70b disposed on or defined in a lower surface of the stem. In a preferred embodiment, the first positioning part is an opening 70b disposed on or defined in the upper surface 86 of the disc portion 74 of the compression ring 60, and the third positioning part is a protrusion 70a extending downwardly from the lower surface 92 of the spacer ring 62.

The spacer ring 62 also includes at least one third cable passing part 68 defined therein that is aligned with the first and second cable passing parts in the compression ring 60 and stem 10. It will be appreciated that when the male and female positioning parts are mated, the passing parts are aligned with one another.

Figure 14:
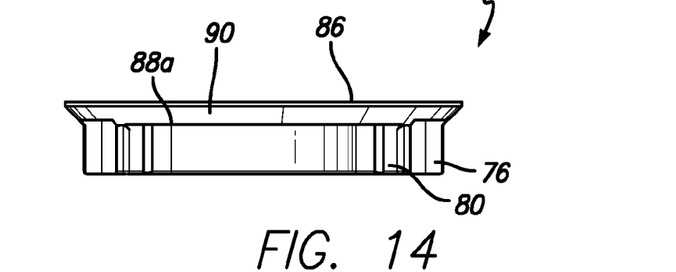
FIG. 14 is a side elevational view of the compression ring.

In a preferred embodiment, the central opening 64 of the compression ring 60 defines a central axis A6, and the first cable passing part 68 defines an axis A7, and axis A7 is substantially parallel to the central axis A6. As is shown in FIG. 14, the disc portion 74 includes an upper surface 86, a lower surface 88 and a tapered surface 90 that tapers downwardly from the external circumference/outer peripheral surface 84 of the upper surface 86 toward an external circumference 88a of the lower surface 88. As shown in FIG. 15, in a preferred embodiment, the first cable passing part 68 penetrates through and is defined in an area of the disc portion 74 between an internal circumference 90a of the tapered surface 90 and the outer peripheral surface 82 of the inner ring portion 78.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A compression ring that is configured to be disposed between a bearing and a stem of a bicycle head parts assembly, the compression ring comprising:
    a central opening for receiving a steering column,
    a cut out portion,
    a first cable passing part disposed radially outwardly from the central opening, and
    a first positioning part for positioning the compression ring with respect to the stem so that the first cable passing part is aligned with a second cable passing part defined in the stem, wherein the first positioning part is configured to prevent the compression ring from rotating with respect to the stem, and wherein the central opening defines a central axis, and wherein the first positioning part is not co-axial with the central axis.

2. The compression ring of claim 1 wherein the first positioning part is disposed on an upper surface of the compression ring, the first positioning part being configured to engage a second positioning part disposed on a lower surface of the stem.

3. A compression ring that is configured to be disposed between a bearing and a stem of a bicycle head parts assembly, the compression ring comprising:
    a central opening for receiving a steering column,
    a cut out portion,
    a first cable passing part disposed radially outwardly from the central opening, and
    a first positioning part for positioning the compression ring with respect to the stem so that the first cable passing part is aligned with a second cable passing part defined in the stem, wherein the first positioning part is disposed on an upper surface of the compression ring, and wherein the first positioning part is configured to engage a third positioning part disposed on a lower surface of a spacer ring that is disposed between the stem and the compression ring.

4. The compression ring of claim 2 wherein one of the first and second positioning parts comprises a female component and the other of the first and second positioning parts comprises a male component.

5. The compression ring of claim 1 wherein the first cable passing part defines an axis that is substantially parallel to the central axis.

6. A compression ring that is configured to be disposed between a bearing and a stem of a bicycle head parts assembly, the compression ring comprising:
    a central opening for receiving a steering column,
    a cut out portion,
    a first cable passing part disposed radially outwardly from the central opening,
    a first positioning part for positioning the compression ring with respect to the stem so that the first cable passing part is aligned with a second cable passing part defined in the stem, and
    a disc portion and a protrusive portion extending from the disc portion, the protrusive portion being configured to support the steering column received in the central opening.

7. The compression ring of claim 6 wherein the protrusive portion comprises an inner ring portion, wherein an outer peripheral surface of the disc portion defines a first outer diameter and an outer peripheral surface of the inner ring portion defines a second outer diameter, and wherein the second outer diameter is smaller than the first outer diameter.

8. The compression ring of claim 7 wherein the disc portion includes an upper surface, a lower surface and a tapered surface that tapers downwardly from an external circumference of the upper surface toward an external circumference of the lower surface, wherein the first cable passing part penetrates through an area of the disc portion between an internal circumference of the tapered surface and the outer peripheral surface of the inner ring portion.

9. The compression ring of claim 7 further comprising a rib portion extending radially outwardly from the outer peripheral surface of the inner ring portion.

10. The compression ring of claim 9 wherein a plurality of the rib portions are disposed around the outer peripheral surface of the inner ring portion.

11. A bicycle head parts assembly comprising:
a bearing configured to be disposed between a bicycle stem and a head tube of a bicycle frame and to rotatably support the bicycle stem on the head tube, and
a compression ring disposed between the bearing and the bicycle stem, wherein the compression ring comprises
a central opening for receiving a steering column,
a cut out portion,
a first cable passing part disposed radially outwardly from the central opening, and
a first positioning part for positioning the compression ring with respect to the bicycle stem such that the first cable passing part is aligned with a second cable passing part defined in the bicycle stem, wherein the first positioning part is configured to prevent the compression ring from rotating with respect to the stem, and wherein the central opening defines a central axis, and wherein the first positioning part is not co-axial with the central axis.

12. The compression ring of claim 4 wherein the second positioning part is not co-axial with the central axis.

13. The bicycle head parts assembly of claim 11 wherein the first positioning part is disposed on an upper surface of the compression ring, the first positioning part being configured to engage a second positioning part disposed on a lower surface of the stem.

14. The bicycle head parts assembly of claim 11 wherein the first positioning part is configured to engage a third positioning part disposed on a lower surface of a spacer ring that is disposed between the stem and the compression ring.

15. The bicycle head parts assembly of claim 13 wherein one of the first and second positioning parts comprises a female component and the other of the first and second positioning parts comprises a male component.

16. The bicycle head parts assembly of claim 11 wherein the first cable passing part defines an axis that is substantially parallel to the central axis.

17. The bicycle head parts assembly of claim 11 wherein the compression ring includes a disc portion and a protrusive portion extending from the disc portion, the protrusive portion being configured to support the steering column received in the central opening.

18. The bicycle head parts assembly of 17 wherein the protrusive portion comprises an inner ring portion, wherein an outer peripheral surface of the disc portion defines a first outer diameter and an outer peripheral surface of the inner ring portion defines a second outer diameter, and wherein the second outer diameter is smaller than the first outer diameter.

19. The bicycle head parts assembly of claim 18 wherein the disc portion includes an upper surface, a lower surface and a tapered surface that tapers downwardly from an external circumference of the upper surface toward an external circumference of the lower surface, wherein the first cable passing part penetrates through an area of the disc portion between an internal circumference of the tapered surface and the outer peripheral surface of the inner ring portion.

\* \* \* \* \*